(No Model.)

C. C. SCHWANER & J. F. KIEDAISCH.
BUNG AND SPIGOT COMBINED.

No. 419,716. Patented Jan. 21, 1890.

Witnesses:
M. P. Smith.
R. H. Orwig.

Inventors, Christian C. Schwaner,
J. Frederick Kiedaisch.
By Thomas G. Orwig, Att'y.

UNITED STATES PATENT OFFICE.

CHRISTIAN C. SCHWANER, OF WINTERSET, AND JOHN FREDERICK KIEDAISCH, OF KEOKUK, IOWA.

BUNG AND SPIGOT COMBINED.

SPECIFICATION forming part of Letters Patent No. 419,716, dated January 21, 1890.

Application filed July 24, 1888. Serial No. 280,950. (No model.)

*To all whom it may concern:*

Be it known that we, CHRISTIAN C. SCHWANER, of Winterset, in the county of Madison, and JOHN FREDERICK KIEDAISCH, of Keokuk, in the county of Lee and State of Iowa, have invented a new and useful Faucet, of which the following is a specification.

Our object is to provide a faucet that can readily be applied to a keg, barrel, or other vessel adapted for storing and transporting beer and other liquids, in such a manner that it will serve as a fixed plug that can be opened at pleasure to allow the liquid to flow out whenever desired, and also readily closed and sealed to prevent opening while the vessel is stored or in transit.

Our invention consists in the construction and combination of a tubular plug adapted to be fixed in a bore in the wooden head of a vessel, a sliding tubular valve, an adjustable gland and packing, and a detachable cap and sealing device, as hereinafter set forth, pointed out in our claims, and illustrated in the accompanying drawings, in which—

Figure 1:
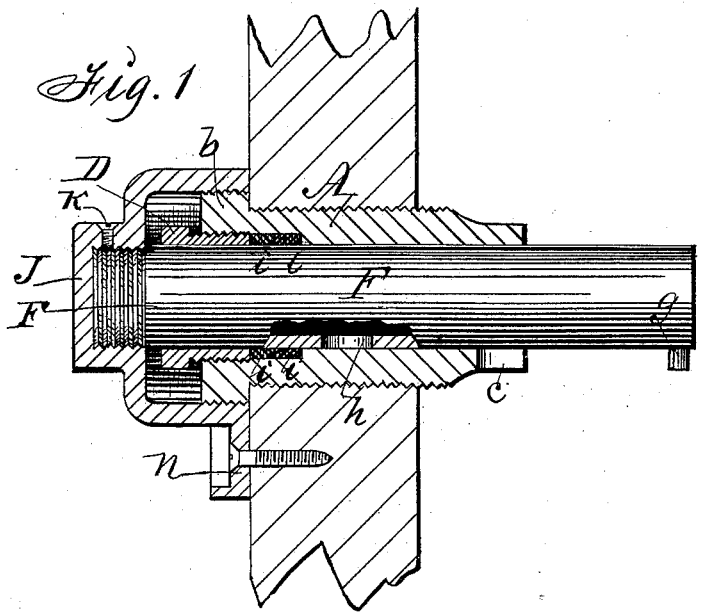
Figure 2:
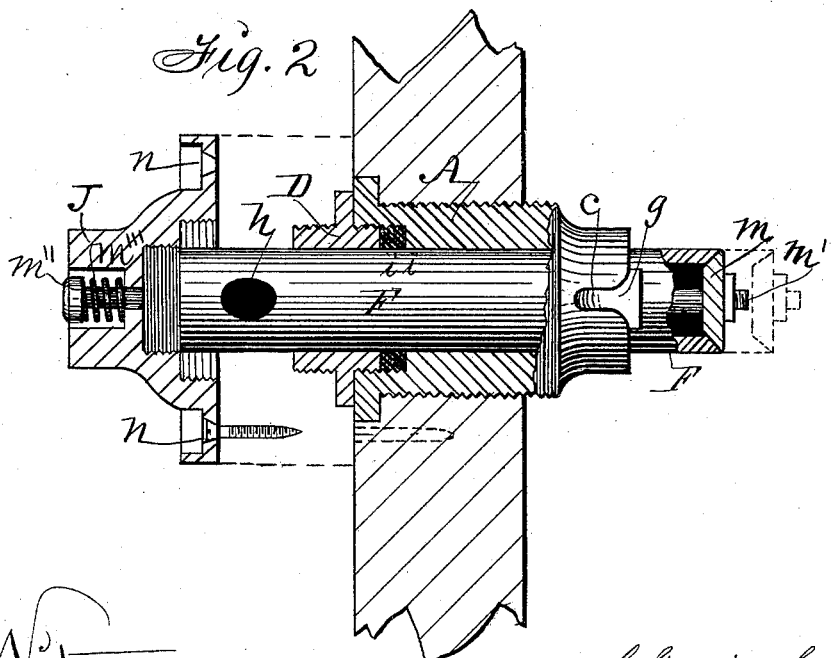

Figure 1 is a sectional view showing our device attached to a piece of barrel-head and closed and sealed, as required, to protect liquid merchandise in store or during transit. Fig. 2 is a modification of Fig. 1, showing the device unsealed and open as required to allow liquid to flow from a vessel, and a spring-actuated valve combined with the tubular sliding valve.

A is a tubular metal bushing that has an annular flange $b$ at its outer end and a slot $c$ at its inner end. It is externally screw-threaded to adapt it to be fixed in a bore made in the wooden head of a vessel, and internally threaded at its outer end to receive a screw-threaded gland D. The external portion of this gland may vary as desired.

F is a tube fitted to slide and rotate in the bushing A. It has a fixed pin or integral projection $g$ at its inner end, and an eduction-port $h$ at its front or outer end portion and under side, thus arranged relative to each other, so that when the tube is drawn out the projection must enter the slot $c$ in the bushing A, as required, to bring the port $h$ to the under side of the rotating tube before it is uncovered by the bushing A, so that liquid entering the tube can flow out downward through the port. The gland D is fitted around the tube F and screwed into the outer end of the bushing A and upon packing-rings $i$ $i$. The head of this gland may vary in form to be adapted for any form of wrench that can be applied to rotate it.

J is a cap that has two screw-threaded bores of different diameters adapted to engage the screw-threaded ends of the bushing A and the tube F in such a manner that when the cap is fixed to the tube, by means of a set-screw $k$ or in any suitable way, the cap and tube will rotate jointly as the cap is screwed on and off from the end of the bushing, as required in opening and closing the faucet.

$m$ in Fig. 2 is a valve on the inner end of a valve-stem $m'$, that extends through the tube F and the cap J. The valve is fitted to the inner end of the tube, and the stem has a button $m''$ on its outer end and a coiled spring $m'''$ placed under the button and around the stem in such a manner that it will in its normal condition press the button and stem outward, as required to retain the valve $m$ closed upon its seat in the inner end of the tube. By this means the tube can be pulled out and the fluid restricted from flowing through the tube until the valve $m$ is opened by pressure upon the button $m''$.

$n$ is a sealing device in the form of an extension or flange formed integral with the cap J. It may vary in size and form as desired, but must be adapted to come in contact with the wood into which the bushing A is fixed in such a manner that a screw can be passed through the sealing device into the wood and the head of the screw then covered with wax and a seal or stamp used to make an impression and mark upon the wax, so that the faucet cannot be opened without breaking the seal. A private mark can be thus readily used in combination with our faucet to prevent unauthorized persons from opening the faucet.

We claim as our invention—

1. A faucet comprising a metal bushing, a gland fixed to one end of the bushing, a sliding tube having an eduction-port extended through said bushing and gland, a cap fixed to the outer end of said sliding tube and adapted to be fixed to the metal bushing and sealed, and a valve fitted to the inner end of the sliding tube and provided with a stem that extends through the sliding tube and the cap on the tube, arranged and combined to operate in the manner set forth, for the purposes stated.

2. A faucet comprising a tubular bushing adapted to screw into a barrel-head, a gland fitted in the outer end of the bushing, a tube having an eduction-port fitted in and extended through said bushing and gland, and a cap fixed to the outer end of said tube and provided with an internal screw-thread to engage an external screw-thread on the outer end of the bushing, to operate in the manner set forth.

3. A metal bushing A, a tube F, a cap J, fixed to the end of the said tube and provided with a screw-thread to engage a corresponding screw on the said bushing, a valve $m$, having a stem $m'$, a head $m''$, and a spring $m'''$, arranged and combined to operate in the manner set forth, for the purposes stated.

CHRISTIAN C. SCHWANER.
J. FREDERICK KIEDAISCH.

Witnesses for Christian C. Schwaner:
   C. H. LANCASTER,
   F. B. HORTON.
Witnesses for J. Frederick Kiedaisch:
   JNO. WURSTER,
   FRANK ZERR.